United States Patent [19]
Herbenar

[11] 3,951,557
[45] Apr. 20, 1976

[54] DUAL SEAT BALL AND SOCKET JOINT
[75] Inventor: Edward J. Herbenar, Detroit, Mich.
[73] Assignee: TRW Inc., Cleveland, Ohio
[22] Filed: Oct. 19, 1973
[21] Appl. No.: 408,152

Related U.S. Application Data
[63] Continuation of Ser. No. 274,870, July 25, 1972.

[52] U.S. Cl. .............................................. 403/138
[51] Int. Cl.² ........................................ F16C 11/06
[58] Field of Search ..................... 403/132, 138, 140

[56] References Cited
UNITED STATES PATENTS

| | | | |
|---|---|---|---|
| 3,004,786 | 10/1961 | Herbenar | 403/140 |
| 3,128,110 | 4/1964 | Herbenar | 403/138 |
| 3,168,339 | 2/1965 | Townsend | 403/138 |
| 3,272,541 | 9/1966 | Latzen | 403/138 |
| 3,290,074 | 12/1966 | Korecky | 403/132 |

FOREIGN PATENTS OR APPLICATIONS

| | | | |
|---|---|---|---|
| 840,176 | 7/1960 | United Kingdom | 403/138 |
| 1,005,682 | 9/1965 | United Kingdom | 403/138 |

*Primary Examiner*—Andrew V. Kundrat

[57] ABSTRACT

A dual seat ball joint having a socket housing with an interior cavity, a ball stud having the ball end received in the cavity, a load-carrying bearing having a surface mating with the ball end of the stud, a wear takeup bearing having a surface mating with a portion of the ball-ended stud and a spring to urge the wear takeup bearing against the ball end of the stud and towards the load carrying bearing with a predetermined clearance between the bearings to prevent wear takeup past a given point.

2 Claims, 5 Drawing Figures

U.S. Patent   April 20, 1976   3,951,557
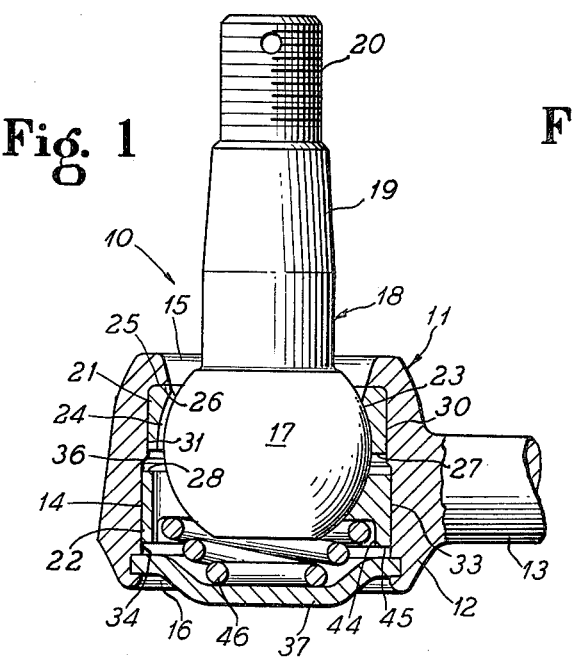
Fig. 1
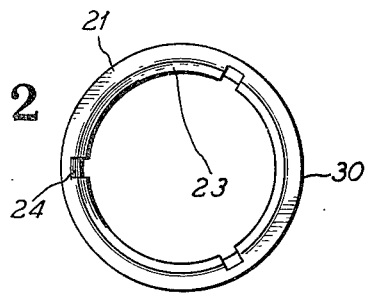
Fig. 2
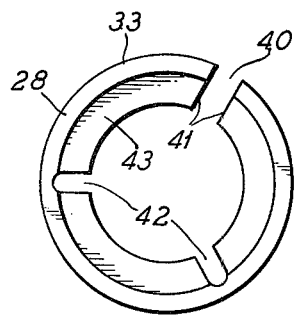
Fig. 3
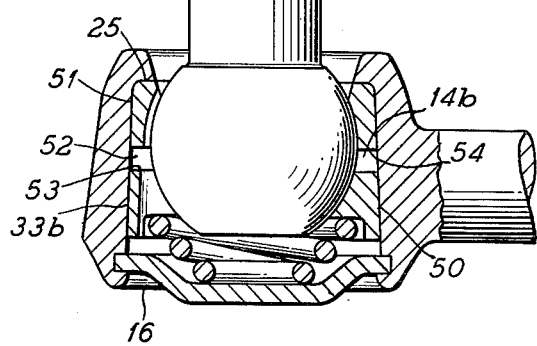
Fig. 4
Fig. 5

DUAL SEAT BALL AND SOCKET JOINT

This is a continuation of application Ser. No. 274,870, filed July 25, 1972.

BACKGROUND OF THE INVENTION

1. Field of the Invention

This invention relates to a universal-type socket joint and more particularly to a dual seat ball joint.

2. Prior Art

Ball joints are well-known to the art and generally include a housing member having a cavity therein with axial openings. A ball-ended stud is received in the cavity with the ball end positioned in the cavity and the shank of the stud projecting out one of the openings. A bearing member is often received between the cavity walls and the ball end of the stud. The other opening is closed by a closure plate.

It has also been known to provide dual bearing joints having a load-carrying bearing and a load-applying bearing with a spring acting against the load applying bearing to force it against the ball end of the stud.

It has further been known to provide wear takeup capabilities in a bearing designed for use in a ball joint. Such wear takeup capabilities have included spring-urged bearings, compressible bearings and the like.

While such prior art bearings have satisfied many problems encountered in the life usage of ball socket joints, problems can arise related to the wear of the bearing surfaces and, in some instances, of the ball surface. If the bearing surface wears sufficiently, the ball can come into contact with the throat opening of the housing. When this occurs, it is possible under severe jars to the system, or as a result of further wear of the housing itself, for the ball stud to pop out of the housing. To the extent that there is still wear takeup capability in a portion of the bearing, sufficient to maintain bearing contact with the ball, this condition can occur without looseness having been noticed in the joint assembly. Thus, it is difficult for test procedures to be established which will determine when the wear condition on the interior of the joint has reached a point necessitating replacement of the joint or at least of the internal components thereof.

This problem is aggravated due to the fact that the majority of prior art joint assemblies have utilized a single-piece bearing. A single-piece bearing must, of necessity, if it is to take up wear, be formed of a relatively soft material. It would therefore be an advance in the state of the art if a bearing assembly could be constructed having a long-lasting relatively hard surface load-carrying bearing at the throat opening of the housing while at the same time having wear takeup capabilities. It would still be a further advance in the art if such a joint could have built-in limitations as to the amount of wear which it will take up or which provides means of ascertaining when sufficient wear has occurred to require replacement.

SUMMARY OF THE INVENTION

My invention provides a solution to the above problems, and utilizes a dual bearing joint. A first bearing is received in the joint housing adjacent the throat opening of the housing. The first bearing is a load bearing and is preferably constructed of a long-wearing, relatively dense bearing material. For example, the load-carrying bearing can be made of a ferrous or other metal or of a high-density plastic material.

A second bearing member is received within the housing and is spring-urged against the ball end of the stud to force the ball end against the load-carrying bearing. In a preferred embodiment, the second bearing is a split bearing and is capable of circumferential compression to maintain tight seating against the ball surface. In all of the embodiments disclosed, means are provided limiting the amount of wear which can be taken up by the wear takeup bearing. After this time, a looseness condition will occur from further wear. This looseness or zero torque can be determined from exterior of the socket and indicates that the socket or at least the interior components thereof should be replaced. The preferred method of preventing further wear takeup as disclosed in this invention is to limit the amount of travel towards the load-carrying bearing which the wear takeup bearing can undergo. This can be controlled by a predetermined builtin clearance between the wear takeup bearing and the load bearing, so that when the desired amount of wear takeup has occurred, the wear takeup bearing will bottom against the load carrying bearing. Further movement will then be prevented of the wear takeup bearing and further wear will cause a looseness of the ball-ended stud within the housing.

My invention has a number of advantages over prior art devices. These advantages derive from the combined construction of the device according to my invention, and include such features as a maximum bearing surface through the use of a full ball stud, increased load resistance to housing pullout and ball-to-housing wedge or cam-out; a universal design capable of being constructed with either a combination steel and plastic bearing assembly or a dual-plastic bearing assembly, and with or without lubrication as desired. Further, my design provides continuous seating of the ball in the bearing through the designed wear life. In addition, the wedging action of the preferred wear takeup bearing is such as to reduce the load-reversal during high load applications, thereby allowing the use of a lighter spring for wear takeup than has been customary in prior art bearings.

It is therefore an object of this invention to provide a dual bearing universal movement socket joint with wear takeup capabilities.

It is a further and more particular object of this invention to provide a dual bearing universal ball socket joint with limited wear takeup capabilities.

It is another and more particular object of this invention to provide a ball joint having a dual bearing interior of the housing cavity, one bearing providing a loading bearing and the other bearing providing a wear takeup bearing, the second bearing being restrained in the amount of wear takeup allowable by limiting movement of the second bearing towards the first bearing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary cross-sectional view of a ball and socket joint constructed according to the principles of this invention;

FIG. 2 is a plan view of the load carrying bearing as used in this invention;

FIG. 3 is a plan view of the wear takeup bearing as used in this invention;

FIG. 4 is a view similar to FIG. 1, illustrating a modified form of the joint of this invention; and FIG. 5 is a view similar to FIGS. 1 and 4, illustrating another modified form of the joint of this invention.

DESCRIPTION OF THE PREFERRED EMBODIMENTS

FIG. 1 illustrates a universal type ball and socket joint 10. The ball and socket joint includes a housing member 11 with a housing end 12 which has a shank 13 projecting therefrom. The housing end 12 has an internal cavity 14 therein with axially open ends 15 and 16. The cavity 14 receives a ball 17 ended stud 18 which has a shank portion 19 projecting through the open end 15 of the housing 12. The shank 19 terminates in a threaded portion 20 for connection to a steering linkage member. The open end 15 is referred to as the throat end opening to the cavity 14.

Disposed within the interior of the cavity 14 is a load-carrying bearing 21 and a wear takeup bearing 22. The load-carrying bearing 21 is pressed or slip-fitted into the cavity 14 and is preferably manufactured of ferrous or other metal or long-wearing substantially rigid plastic material. The bearing 21 has a part-spherical inner surface 23 which mates against the spherical ball 17. Lubrication grooves 24 may be provided in the surface 23 for supplying lubrication to the mating interface between the ball and the bearing. The bearing 21 has an outside axial end wall 25 which mates against an in-turned lip 26 of the housing at the throat opening 15. The bearing 21 has an inside axial end wall 27 positioned within the cavity in spaced relation to the inside end wall 28 of the wear takeup bearing 22. The outer diameter 30 of the load-carrying bearing is preferably dimensioned with respect to the inner diameter 31 of the housing cavity 14 so that the load bearing is press or slip-fitted into the cavity.

The wear takeup bearing 22 has an outer diameter 33 received within the cavity in contact with the inner diameter 34 wall of the cavity 14 in the area behind the load-bearing 21. It will be appreciated that in the embodiment illustrated in FIG. 1, the cavity 14 is stepped so that the walls 31,34 of the cavity 14 have different diameters. In the illustrated embodiment, the diameter of the wall portion 34 will be greater than the diameter of the wall portion 31 providing a step 36 intermediate the two wall portions. Further, the wall portion 34 surrounding the wear takeup bearing may be tapered to increase in diameter from the step 36 to the closure cap 37 closing the large axial open end 16.

As best illustrated in FIG. 3, the wear takeup bearing is split as at 40, providing a gap having circumferential ends 41. Further, lubrication grooves 42 may be provided in the inner surface 43 of the wear takeup bearing. The inner surface 43 is spherically curved and mates with the surface of the ball 17. A centrally disposed recess 44 may be provided in the outside axial end 45 of the wear takeup bearing for receipt of a spring 46 which is entrapped between the bottom of the recess 44 and the closure cap 37 to urge the wear takeup bearing against the ball 17.

Because of the split 40, the wear takeup bearing is circumferentially expansible and contractable. As wear occurs within the system, the spring 46 will press the wear takeup bearing against the ball 17. Because of the spherical seat 43 in the bearing, axial movement of the bearing within the cavity 14 will have a wedge effect against the wall 33 of the cavity. Further, the provision of the slot 40 and the lubrication grooves 42 assures that the bearing is able to conform with the ball end 17 of the stud and with the wall of the housing when urged toward the ball stud by the spring. The wedging action of the slotted bearing and wear takeup spring compensate for wear that occurs during the life of the assembly and prevents unseating of the ball 17 in relationship to the load-carrying bearing. Thus, the ball 17 is always pressed against the load-carrying bearing by the action of the spring and the wear takeup bearing.

It is a specific feature of this invention that means are provided to prevent further wear takeup when wear has reached a predetermined point. In the embodiment of FIG. 1, the means are the step 36. As wear continues to occur, the spring 46 will urge the wear takeup bearing axially of the cavity towards the step 36. When the inside axial end 28 of the wear takeup bearing contacts the step 36, further movement will be prevented. Thus, any further wear will cause a looseness of the stud within the housing. This looseness can be ascertained from exterior of the housing, thereby indicating when replacement of the entire joint or of components thereof is required.

This feature also acts as a safety feature not only from a standpoint of replacement for wear, but by providing a limit to the spring action against the ball 17. Thus, if sufficient wear occurs on the load-carrying bearing, in prior art bearings, the continuous action of the wear takeup spring could force the ball through the throat opening 15. This is eliminated in the present construction due to the provision of the means preventing further wear takeup. Thus, a point is reached where the spring no longer acts to urge the ball out of the housing cavity. By dimensioning the distance between the ledge and the wear takeup bearing inside axial end face 28, defined parameters can be obtained which will terminate the action of the spring at a time sufficiently prior to the point where wear would allow the ball 17 to be pushed or pulled out of the throat opening.

The embodiments of FIGS. 4 and 5 are constructed according to the same principles above explained in connection with FIG. 1. In FIG. 4, however, the cavity 14b has a continuously tapered wall 50 which increases in dimension from the inturned lip 25 to the axial open end 16. The outer diameter 33b of the wear takeup bearing has a mating taper to conform with the wall 50. The provision of the continuous taper also requires a tapered wall outer diameter 51 for the load-carrying bearing.

In this embodiment, the means preventing further wear takeup can consist of a pre-dimensioned gap 52 between the inside axial end 53 of the wear takeup bearing and the inside axial end 54 of the load-carrying bearing. Thus, when the maximum amount of wear has been taken up through the action of the spring pressing the wear takeup bearing towards the load-carrying bearing, the two inside ends 53, 54 will contact, preventing further movement. Because at this time the spring acts against the load-carrying bearing through the wear takeup bearing and not against the ball stud as further wear increases the cavity in which the ball stud operates, the ball stud will again not be forced out of the throat opening.

Additionally, the amount of allowable wear takeup can be controlled by dimensioning the gap 40 of the wear takeup bearing. As wear is taken up, the wear takeup bearing will be forced upwardly against the wedge taper 33b of the wall of the cavity. This will cause the gap 40 to close and when the circumferential ends 41 contact one another, further movement of the wear takeup bearing in the cavity will be prevented due to the wedge action against the walls of the cavity. Of course, the wedge action described in connection with FIG. 1 embodiment continues to operate due to the spherical contact between the ball and the seat of the bearing. This wedge action acts to increase the resistance to side load movement of the ball within the housing. Further, of course, the wedging action of the wear takeup bearing is such that there is a minimum of load reversal during high load applications, thereby requiring only a very light spring for wear takeup in comparison to the prior art bearings.

The embodiment illustrated in FIG. 5 differs from the embodiment of FIGS. 1 and 4 in that the wall 60 of the cavity has a tapered wall portion 61 surrounding the wear takeup bearing and a cylindrical wall portion 62 surrounding the load-carrying bearing. If desired, however, there could be a dual taper so that the portion 62 of the wall is tapered to a different degree than the portion 61. The provision of a different taper at the wall portion 62 again acts to restrain any pushout of the ball by preventing push-out of the load-carrying bearing. The provision of the tapered wall portion 61 surrounding the load-carrying bearing and the corresponding tapered outer diameter 63 of the load-carrying bearing again provides a wedging of the bearing during axial movement. Since the bearing is normally non-moving, its outer diameter is not subject to wear and as it moves axially the gap 40 will be closed until the circumferential ends 41 mate. At that point, further axial movement of the wear takeup bearing in the cavity 60 cannot occur. Thus, the embodiment of FIG. 5 can prevent further wear takeup past a given point either by dimensioning the gap 40 or by dimensioning the space between the axial ends of the wear takeup bearing and the load-carrying bearing as explained in connection with FIG. 4.

It will therefore be seen from the above that my invention provides a universal movement ball socket joint wherein the ball end of the stud is received in the socket cavity in contact with two different bearings, one of which is provided at the throat opening of the cavity and is a load-carrying bearing, preferably made of metal to mate with the metal ball end of the stud or of a high-density long-wearing plastic having resistance to extrusion through the throat opening. The other bearing is a wear takeup bearing and is spring-urged towards the load-carrying bearing. The wear takeup bearing has a bearing seat with a spherical surface adapted to mate against the bottom portions of the ball end of the stud. The wear takeup bearing is provided with a split and with lubrication grooves to allow it to conform to the surface of the ball in spite of the occurrence of wear of the bearing surface. Further, means are provided to limit the amount of wear which the wear takeup bearing will accommodate, thus terminating wear takeup prior to the time that excessive wear could allow failure of the joint. Additionally, a wedging action is provided between the wall of the cavity and the outer diameter of the wear takeup bearing. The wedging action is caused first by the spherical mating between the ball and the seat of the bearing at a point below the full diameter of the ball so that axial movement of the bearing tends to increase the circumference of the bearing except as wear allows a decrease. The tendency of the bearing circumference to increase is accommodated by the split in the bearing. This, however, provides a wedging of the bearing within the cavity, which wedging action compensates for wear and prevents unseating of the ball stud. An additional wedging action can be provided by tapering the cavity of the socket housing as well as tapering the outer diameter wall of the wear takeup bearing.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A ball and socket joint comprising a stud having a shank with a ball end, a housing having an open ended cavity receiving the ball end of said stud with an inturned lip at one end defining a throat receiving the stud shank freely therethrough and a closure plate closing the other end, a rigid wear resisting bearing ring in said cavity seated on said lip and having an internal bearing surface tiltably and rotatably supporting the portion of the ball end of the stud adjacent said shank, a resilient, more yieldable split wear takeup bearing ring in said cavity axially spaced from said rigid ring and having an internal bearing surface tiltably and rotatably supporting the portion of the ball end remote from said shank of the stud, a spring bottomed on said closure plate biasing said split wear take-up ring axially toward the rigid wear resisting bearing ring and against said remote portion of the ball end of the stud, said split ring having opposed circumferential ends defined by said split and a tapered outer periphery converging toward said lip of the housing, said cavity of the housing having at least the portion receiving the tapered periphery of said split ring tapered toward said lip and mating with the tapered outer periphery of said split ring, said tapered outer periphery of the split ring and said tapered portion of the cavity cooperating to urge the opposed circumferential ends of the split ring toward each other in response to axial movement of the split ring toward the rigid wear resisting ring, said split ring being expansible into wedged engagement with the tapered portion of the cavity in response to loads on the stud tending to move the stud into the cavity, and means preventing further movement of the split ring toward the load carrying ring when the circumferential ends of the split ring contact each other, said means preventing further movement of said split ring comprising a preselected relationship between the size of the gap between the circumferential ends of the split ring, the sectional radial thickness of the split wear takeup bearing ring, and the convergent annular radial space between the surface of the ball and the tapered wall of the housing cavity receiving the split ring such that the ends of the split ring will contact prior to wear of the parts beyond a predetermined degree so that further wear will develop looseness of the stud in the housing to indicate the worn condition of the joint components.

2. A ball and socket joint which comprises a stud having a shank with a ball end, a housing having an open ended cavity receiving said ball end with an inturned lip at one end of the cavity defining a throat receiving the shank of the stud freely therethrough and a closure plate closing the other end of the cavity, a rigid wear resisting bearing ring in said cavity seated on said lip, a resilient plastic split wear takeup bearing ring in said cavity axially spaced from said rigid ring, said split ring having a gap between the split ends thereof, said rigid ring and split ring having inner peripheral bearing surfaces tiltably and rotatably supporting said ball end of the stud with the inner peripheral bearing surface of the rigid ring engaging the portion of the ball end adjacent the shank and the inner peripheral surface of the split ring engaging the free end portion of the ball opposite the shank, a spring seated on said closure plate urging said split ring toward the rigid ring and against said ball end and urging the ball end against said rigid ring in seated engagement therewith, said ball end spreading said split ring into tight engagement with the housing cavity wall and wedging said split ring against said wall when loads on said stud tend to push the stud in the housing for resisting end movement of the stud, means in the joint proportioned to the size of said gap and to the axial spacing of said split and rigid rings so as to arrest the shifting of the split ring toward the rigid ring after a predetermined amount of wear occurs between the ball end and said rings and prior to the split ring achieving its full wear takeup potential whereupon the ball stud will become loose in the housing to indicate the worn conditions of the joint components, and the split ends of said resilient ring maintains said gap therebetween at least until the arresting means become effective to stop further movement of the split ring toward the rigid ring, said means arresting movement of the split ring being opposed abutting surfaces at the split ends of the ring and a tapered cavity wall portion contracting the split ring.

\* \* \* \* \*